No. 606,818. Patented July 5, 1898.
W. J. BEST.
BICYCLE SADDLE.
(Application filed June 15, 1896.)
(No Model.)

WITNESSES:
Edwy K. Shaw.
Los Moulton.

INVENTOR:
William J. Best
By—
Moulton and Flanders
Attorneys.

UNITED STATES PATENT OFFICE.

WILLIAM J. BEST, OF GRAND RAPIDS, MICHIGAN.

BICYCLE-SADDLE.

SPECIFICATION forming part of Letters Patent No. 606,818, dated July 5, 1898.

Application filed June 15, 1896. Serial No. 595,590. (No model.)

*To all whom it may concern:*

Be it known that I, WILLIAM J. BEST, a citizen of the United States, residing at Grand Rapids, in the county of Kent and State of Michigan, have invented certain new and useful Improvements in Bicycle-Saddles; and I do hereby declare the following to be a full, clear, and exact description of the invention, such as will enable others skilled in the art to which it appertains to make and use the same.

My invention relates to improvements in bicycle-saddles; and its object is to provide the same with certain new and useful features, hereinafter more fully described, and particularly pointed out in the claims, reference being had to the accompanying drawings, in which—

Figure 1:
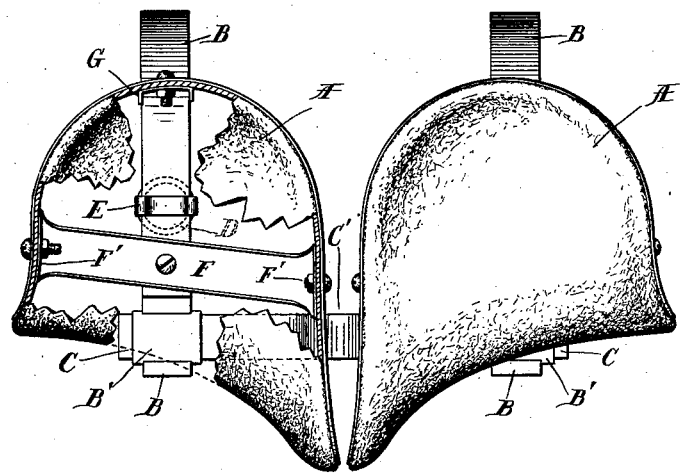
Figure 2:
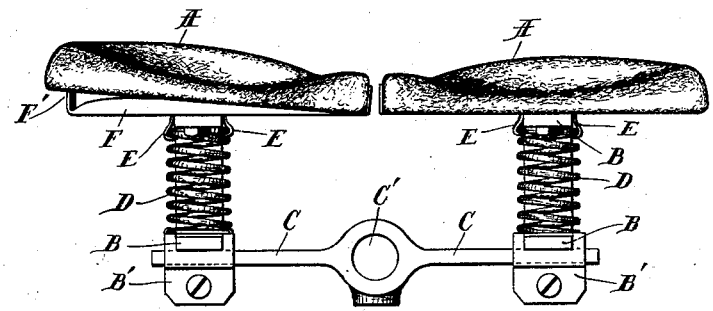
Figure 3:
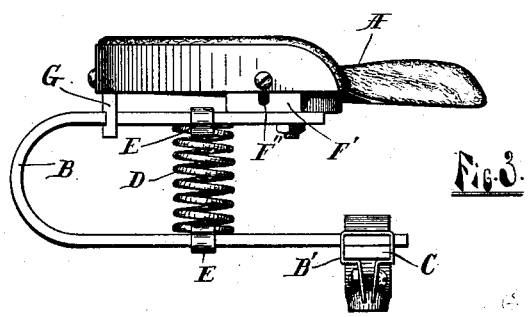
Figure 4:
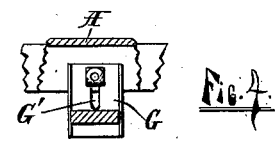

Figure 1 is a plan view of a device embodying my invention, with parts broken away to show construction; Fig. 2, a front elevation of the same, showing one of the seat divisions tilted laterally; Fig. 3, a side elevation, and Fig. 4 a detail showing construction of the rear adjustment of the seat.

Like letters refer to like parts in all of the figures.

A A are the two halves of the saddle or seat proper, which are entirely independent of each other and are molded to fit the rider.

B B are U-shaped springs beneath the halves of the seat and are attached to and support the same, said springs being attached at their opposite ends by suitable clips B' to the cross-bar C, which bar has an opening C' to receive the arm of the bicycle seat-post. Spiral springs D are interposed between the arms of the springs B and are adjustably secured thereto by means of the spring-clasps E, which clasps allow a longitudinal adjustment of said springs D along said arms. Beneath the seat A are transverse channel-bars F, to which the springs B are secured, said bars having upturned ends F', to which the seat is secured by means of bolts. In the outer upturned ends of the bars F are provided slots F'', through which the bolts pass, thus allowing the sides of the seat to be vertically adjusted. The rear of said seat is also made vertically adjustable by providing prop-plates G, which are secured to the springs B and, extending upward, are secured to the seat A by means of bolts which pass through slots G' in said plates. The sides and back of said seat may thus be adjusted to suit any person, and the two parts of the same may be set nearer together or farther apart by adjusting the clips B' on the bar C. The saddle may also be moved backward or forward in relation to the bar C and seat-post by adjusting the clips on the springs B. By interposing the springs D, I obviate the necessity of making the springs B very stiff for heavy riders, as the springs D may be moved forward along the arms of the springs B and serve as flexible props to the forward ends of said springs B, and when more flexibility is desired said springs may be moved farther to the rear.

The operation of my invention is obvious.

Having fully described my invention, what I claim is—

1. In a divided bicycle-saddle, the combination with the separate seat divisions, of a transverse bar for each of the same, each of said bars having upturned ends engaging the sides of the seat divisions, respectively, an adjustable means for attaching one side only of each seat division adjustably to the adjacent upturned end of said transverse bar, whereby the angle of inclination transversely of each seat division is independently adjustable, prop-plates secured to said support and engaging the rear ends of said seat divisions, and means for attaching said rear ends adjustably to said prop-plates and for holding the same rigidly in adjusted position, substantially as shown and described.

2. In a bicycle-saddle, in combination, a divided seat, transverse bars beneath said divisions, slotted upturned ends on said bars, bolts passing through said slots, and securing said bars to said seat, U-shaped springs secured to said bars, prop-plates having slots, secured to said springs, and bolts securing said seat to said plates, substantially as described.

3. The combination of a divided seat, transverse bars beneath said seat, slotted upturned ends on said bars, bolts securing said seat to said ends, U-shaped springs secured to said bars, slotted prop-plates secured to said springs, bolts securing said seat to said plates, spiral springs, clasps on said springs engaging said U-shaped springs and longitudinally adjustable thereon, a transverse bar, and clips securing said bar to said U-shaped springs, substantially as described.

In testimony whereof I affix my signature in presence of two witnesses.

WILLIAM J. BEST.

Witnesses:
 LEWIS E. FLANDERS,
 LOIS MOULTON.